United States Patent [19]

Wilkerson

[11] 4,366,388
[45] Dec. 28, 1982

[54] ENERGY UTILIZATION CIRCUIT AND METHOD

[76] Inventor: Alan W. Wilkerson, 410 Madero Dr., Thiensville, Wis. 53092

[21] Appl. No.: 205,768

[22] Filed: Nov. 10, 1980

Related U.S. Application Data

[63] Continuation of Ser. No. 34,632, Apr. 30, 1979, abandoned.

[51] Int. Cl.³ .......................... H02J 1/12; H02J 7/34; H02P 13/20
[52] U.S. Cl. ...................................... 307/46; 307/48; 307/150; 307/151; 322/32
[58] Field of Search .................... 307/45, 46, 44, 47, 307/48, 65, 66, 67, 68, 72, 73, 75, 76, 84, 82, 87, 150, 151, 22, 23, 26, 29, 64; 322/100, 32, 2 R; 363/98, 142, 174, 175, 136

[56] References Cited

U.S. PATENT DOCUMENTS

| | | | |
|---|---|---|---|
| 2,470,797 | 5/1949 | Thomas | 290/44 |
| 3,526,778 | 9/1970 | Crocker et al. | 307/65 X |
| 3,946,242 | 3/1976 | Wilkerson | 307/45 |
| 4,059,772 | 11/1977 | Wilkerson | 307/46 |
| 4,140,959 | 2/1979 | Powell | 307/46 X |
| 4,287,465 | 9/1981 | Godard et al. | 307/46 X |

FOREIGN PATENT DOCUMENTS 1534126 6/1967 France.

OTHER PUBLICATIONS

Windmill Stage A Comeback, T. S. Jayadev, IEEE Spectrum, Nov. 1976, pp. 45-49.

Primary Examiner—Thomas W. Brown
Assistant Examiner—S. D. Schreyer
Attorney, Agent, or Firm—Andrus, Sceales, Starke & Sawall

[57] ABSTRACT

An energy utilization circuit and method energizes a.c. loads with a.c. power of conventional voltage and frequency characteristics. A coverter responsive to an energy source, typically a wind or solar driven generator, converts the energy to d.c. electrical power. An inverter alters the d.c. power to a.c. power. An a.c. wave generator, such as an alternator, is connected to the output of the inverter. The alternator is operated to impress its voltage and frequency on the output of the inverter so as to lend conventional characteristics to this output. Excess power from the inverter maintains the operation of the alternator.

24 Claims, 9 Drawing Figures

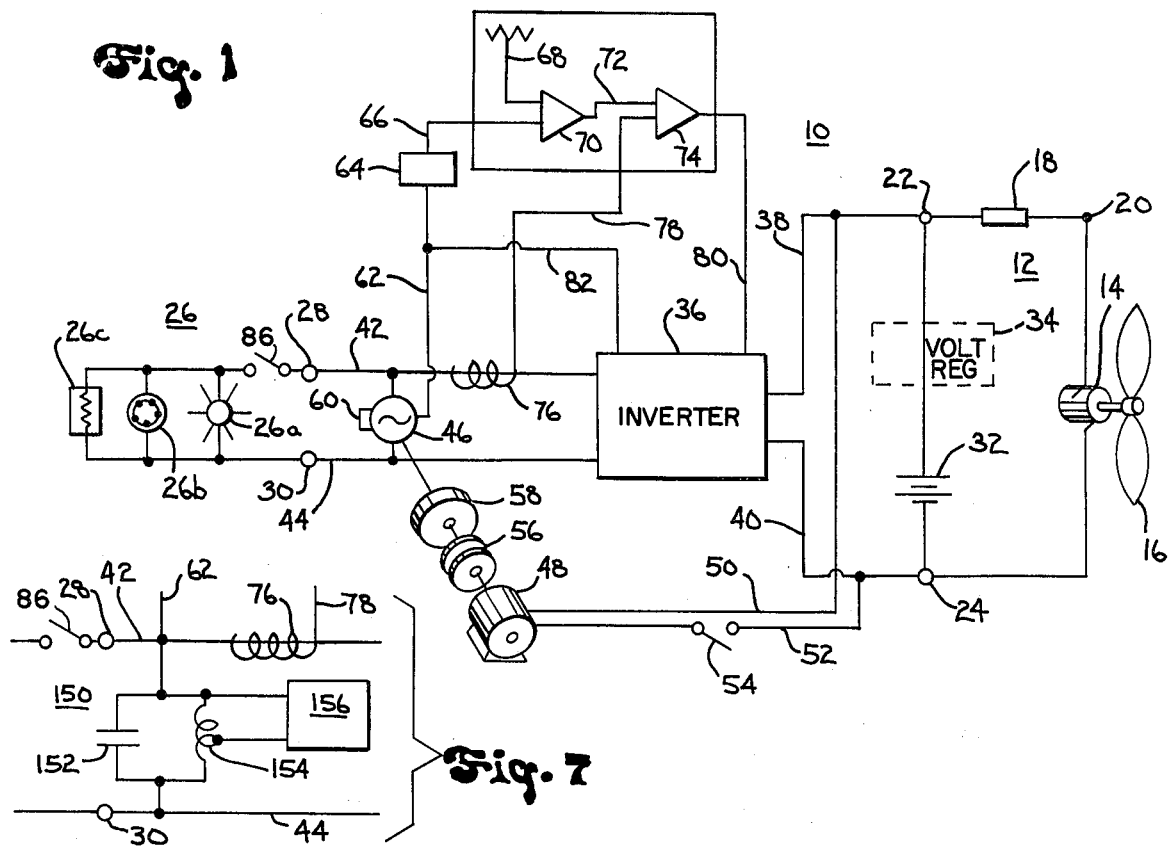
Fig. 1
Fig. 7
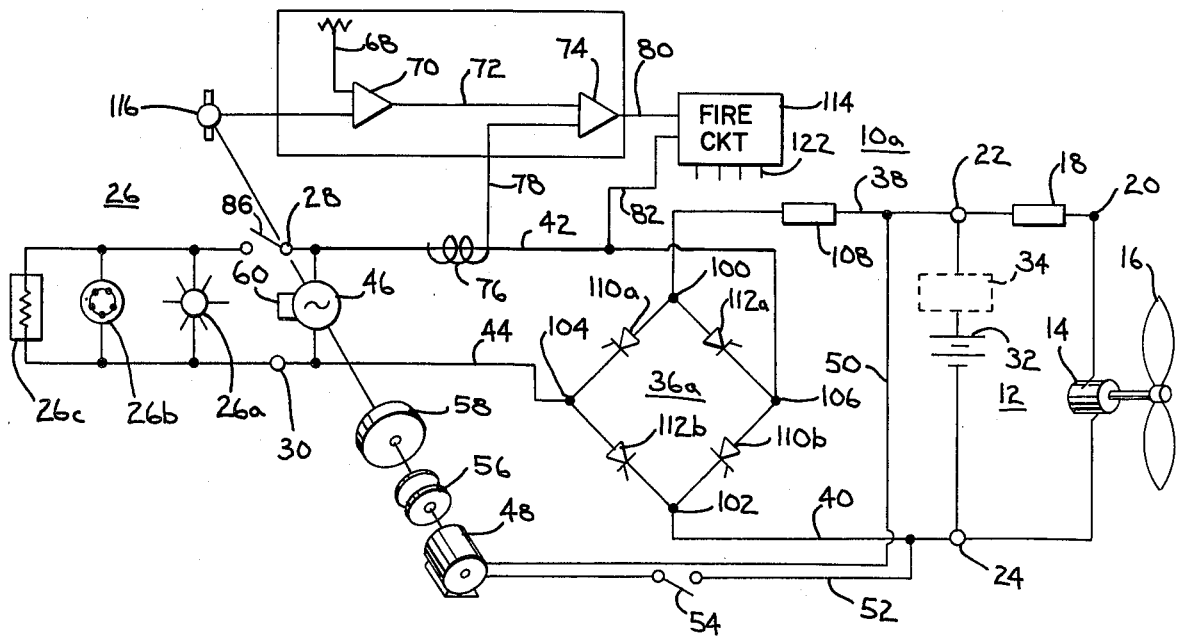
Fig. 2

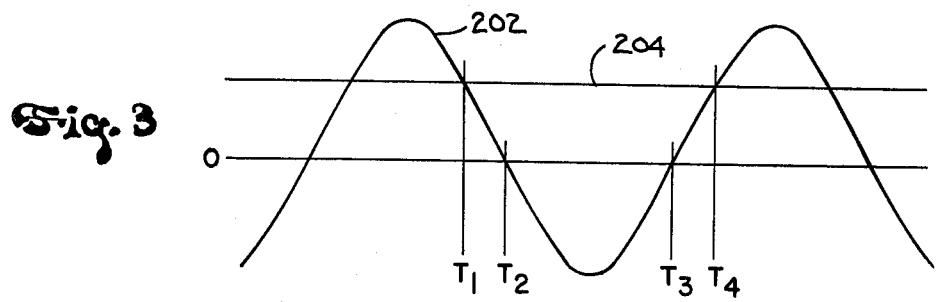
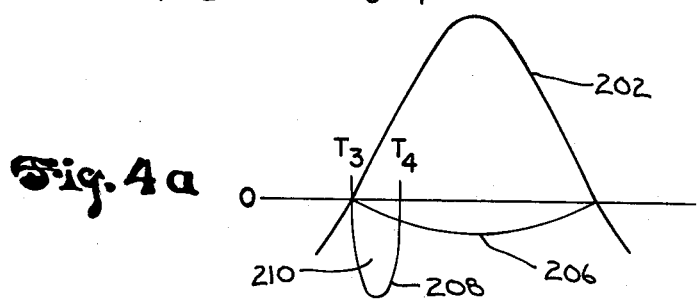
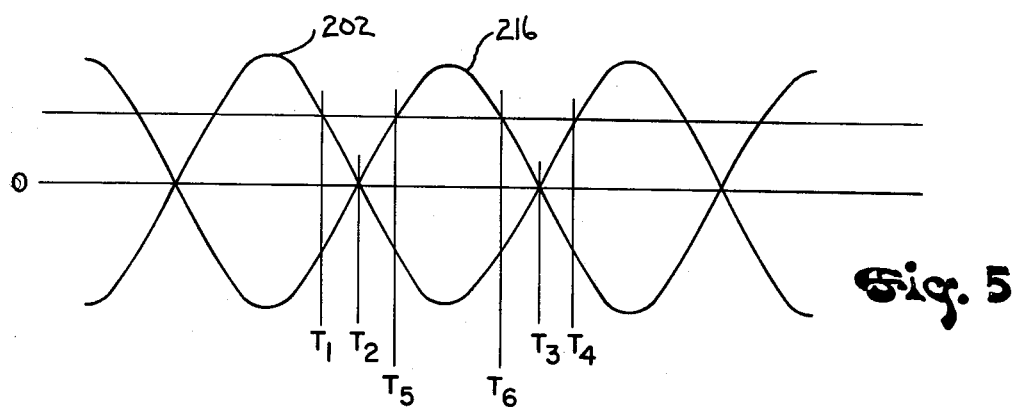
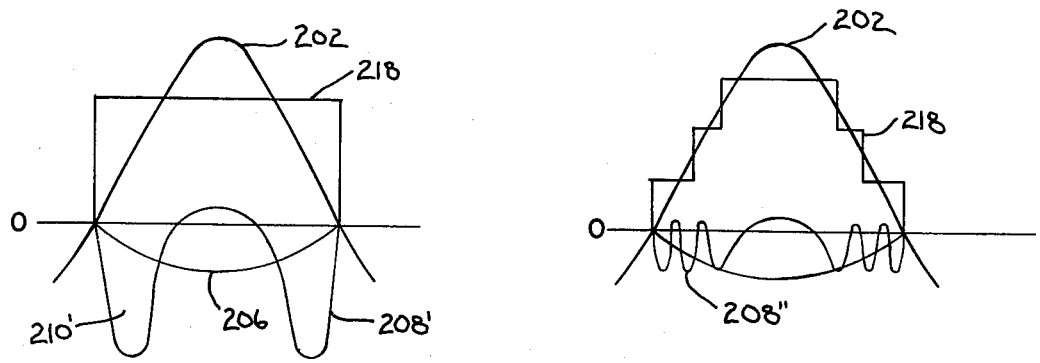

ENERGY UTILIZATION CIRCUIT AND METHOD

This application is a continuation of application Ser. No. 034,632, filed Apr. 30, 1979 and now abandoned.

BACKGROUND OF THE INVENTION

1. Field of the Invention

The present invention relates to circuitry for obtaining electrical power of conventional voltages and frequencies from sources from energy. The sources of energy are typically non-electrical.

BACKGROUND OF THE INVENTION

2. Description of the Prior Art

Currently, electrical energy is ordinarily transmitted and used in the form of a.c. power. The voltage characteristics, including magnitude and wave form, and the frequency characteristics of such a.c. power are standardized, for example, a voltage magnitude of 110 or 220 volts and sinusoidal wave form and a frequency of 50 Hz or 60 Hz.

The obtaining of electrical power from presently unused, or underutilized, sources, such as the geophysical energy of the sun and wind or industrial waste energy, is often thwarted because electrical conversion means directly responsive to such sources do not produce a.c. power with the necessary standard voltage and frequency characteristics. This means that such energy may be used only for special types of loads or that additional equipment, such as inverter circuitry must be interposed between the conversion means and the load to provide the a.c. power. However, conventional inverters typically exhibit less than desirable output properties, as in failing to provide true sinusoidal characteristics to the output voltage. Most inverters require a constant magnitude of d.c. input. This is not readily obtainable from geophysical energy sources. As their current capabilities are closely defined, it is difficult for inverters to handle transient current demands, such as the starting inrush currents of a.c. induction motors. Such loads must be avoided or specially handled, or the inverter must be oversized with respect to normal loads in order to handle transient peaks. This tends to be expensive and inefficient.

Applicant's earlier U.S. Pat. Nos. 3,946,242 and 4,059,772 disclose circuitry and methods for obtaining electrical power from unused, or little used, sources and supplying same to a.c. electrical loads which avoid many of the foregoing problems. The techniques of those patents contemplated connection of the circuitry to an existing a.c. power distribution grid. The a.c. power grid established the voltage and frequency characteristics of the obtained power, received excess power generated by the circuitry, and supplied any power deficit to the a.c. loads. However, in some cases the necessity for a.c. power lines could be limiting.

SUMMARY OF THE PRESENT INVENTION

The present invention is therefore directed to circuitry and method for utilizing energy sources of the kind typified above to produce a.c. power having required voltage and frequency characteristics which does not require connection to power lines in order to function. The voltage and frequency characteristics will usually be those of standardized a.c. power. The circuitry may thus "stand alone" and is suitable for use in a wide variety of applications including those in which an a.c. power grid is not available. The circuitry of the present invention is capable of handling transient current demands in a fascile manner without overrating components.

Briefly, the present invention contemplates a conversion means responsive to the energy of the source for converting the energy to a corresponding amount of d.c. power An inverting means is connected to the conversion means for inverting the d.c. power to a.c. power. This inverting means may be of the self-commutated type or of the line commutated type. The inverting means is connected to the output terminals of the energy utilization circuit to which conventional a.c. loads such as lights, motors, and heaters are connected.

Importantly, an a.c. wave generator, typically a rotating a.c. machine, such as an alternator, capable of providing an output having the necessary voltage and frequency characteristics is connected in the output of the inverter. An electro-dynamic machine, such as an alternator, acts as either generator or as a motor, depending on its mechanical and electrical inputs. A control signal responsive to the load condition of the alternator, typically the alternator speed or frequency, is provided to the inverting means.

In operation, the alternator is accelerated, preferably in the unloaded condition, to a state in which it provides an output having the desired voltage and frequency characteristics, as by a prime mover. The inverting means is operated responsive to the frequency signal from the alternator to provide a.c. power from the d.c. power of the conversion means. The a.c. load is connected to the circuit for receiving the a.c. power of the inverting means. The a.c. power of the inverting means also appears in an energizing manner across the alternator, permitting the prime mover to be disconnected.

The alternator, connected across the inverting means and driven by it, impresses its voltage magnitude and wave form and frequency characteristics on the square or stepped wave output of the inverting means, causing the latter to assume the form of the former. The alternator acts to take the non-sinusoidal output of the inverting means and filter or smooth it to the alternator's sinusoidal form.

The a.c. wave generator may also be static circuitry, for example, a tank circuit comprised of parallel connected inductive and capacitive components connected across the output of the inverter.

The inverting means is operated by the frequency responsive signal to control the a.c. power to a level sufficient to both energize the load and drive the alternator. If insufficient a.c. power is provided by the inverting means, the alternator will tend to slow and its frequency tend to drop. The frequency responsive signal will cause the inverter to provide more power to restore the alternator to the proper state.

The alternator acts to accommodate transient current peaks by generating current and supplying same to the load over and above that which the inverting means can supply. The alternator is driven by its inertia or that of an associated flywheel at these times.

BRIEF DESCRIPTION OF THE DRAWING

FIG. 1 is a schematic diagram showing one embodiment of the energy utilization circuit of the present invention.

FIG. 2 is a schematic diagram showing another embodiment of the energy utilization circuit of the present invention.

FIG. 3 shows the d.c. voltage and one of the a.c. voltages existing in the circuit of FIG. 2.

FIG. 4a shows currents existing in the circuitry of FIG. 2 during one-half cycle of alternating current voltage and FIG. 4b shows the simultaneous variation in the speed of the alternator employed in the circuit.

FIG. 5 is similar to FIG. 3 and shows an additional a.c. voltage existing in the circuit of FIG. 2.

FIGS. 6a and 6b are similar to FIG. 4a and show the a.c. voltage of the alternator, the outputs of various types of inverters used in the circuit of FIG. 1 and currents existing in such circuitry.

FIG. 7 is a fragmentary schematic diagram showing a static embodiment of the a.c. wave generator employed in the energy utilization circuit of the present invention.

DESCRIPTION OF THE PREFERRED EMBODIMENT

FIG. 1 shows one embodiment of an energy utilization circuit 10 constructed in accordance with the present invention. Energy utilization circuit 10 is operated by d.c. power supply 12 responsive to the energy source. The d.c. power supply is shown in FIG. 1 as including d.c. generator 14 coupled to windmill 16 driven by the wind. It will be appreciated that d.c. power supply 12 may be responsive to other appropriate sources of input energy, such as solar energy, and utilize other means or devices for obtaining d.c. power from the energy.

D.c. generator 14 provides variable amounts of d.c. power corresponding, in quantity, to the energy available from the energy source. D.c. generator 14 includes internal impedance 18 connected between voltage source terminal 20 and output terminal 22. D.c. power supply 12 includes a second output terminal 24.

D.c. power supply 12 may also include an electrical power storage means, such as battery 32 connected across terminals 22 and 24 in parallel with d.c. generator 12. Battery 32 provides power when no, or insufficient, power is available from d.c. generator 14 so as to maintain the operation of energy utilization circuit 10. On the other hand, in many applications, continuity of service is not a primary concern. For example, in the use of energy utilization circuit 10 to drive irrigation pumps, circuit 10 may be rendered operative when the velocity of the wind is sufficient to drive the pumps and deenergized at other times. In such service, battery 32 may be omitted.

If included, battery 32 may be charged by d.c. generator 14 during periods when excess power is available from the generator. Voltage regulator 34 insures proper charging of battery 32. Battery 32 is typically one suitable for charging to a voltage which bears a fixed relationship to the operating voltage supplied to a.c. load 26, hereinafter described. For example, for a single-phase a.c. embodiment of the present invention, battery 32 may be charged to a voltage approximately 10% less than the nominal voltage of a.c. load 26 or, in the case of a 220 volt load, to approximately 200 volts. The capacity of battery 32 is selected in accordance with the expected duration of periods during which insufficient power will be available from d.c. generator 14.

Energy utilization circuit 10 provides power to a.c. load 26 of conventional types, illustratively shown as comprising light 26a, motor 26b, and heater 26c. A.c. load 26 is connected to output terminals 28 and 30 of utilization circuit 10. Load 26 employs a.c. power of defined standard voltage and frequency characteristics, such as a sinusoidal wave form voltage of 220 volts and a frequency of 60 Hz, for operation.

Inverter 36 is connected to the output terminals 22 and 24 of d.c. power supply 12 by conductors 38 and 40 for converting the direct current power of power supply 12 into a.c. power for supply to output conductors 42 and 44 and output terminals 28 and 30. Various types of circuitry are suitable for use as inverter 36. The inverter may be of either the self-commutated or line commutated type. Among the self-commutated inverters, a simple square wave inverter, such as that shown in U.S. Pat. No. 3,331,011 may be employed. Or, a so-called "six step" inverter may be used to provide an output wave form which more closely approaches a sinusoid and to reduce harmonic content. A typical six step inverter suitable for use in the circuit of the present invention is shown in Control Engineering, November, 1971, Volume 18, No. 11, Pages 57-70, particularly Pages 62-63. With self-commutated inverters, it may be necessary to pre-condition or stabilize the voltage of d.c. power supply 12, as by battery 32 or other means.

A suitable line commutated inverter is shown in FIG. 2 and in applicant's earlier patents noted supra.

To establish the wave form, frequency, and voltage of the a.c. power provided to a.c. load 26 by energy utilization circuit 10, an a.c. wave generator is employed. This wave generator may be an electrodynamic a.c. machine, such as an alternator or induction generator. The conventional construction of such machines includes a field element comprised of coils providing a magnetic field relatively rotatable with respect to the conductors of an armature element. When the field is energized and the armature rotated in the former's magnetic field, the machine functions as an a.c. generator, for example an alternator, to supply a.c. power. When the armature receives a.c. power, the rotation of the armature is continued through a motoring action of the machine.

In FIG. 1, an electro-dynamic machine 46 is shown as an alternator which may be of the rotating field-stationary armature type. The armature is connected to conductors 42 and 44 across the output of inverter 36. The field of alternator 46 is coupled to prime mover 48 which is used, in a manner hereinafter described, to accelerate alternator 46 to operating speeds. Prime mover 48 may be of any type suitable for driving alternator 46, such as a gasoline or diesel engine or an electric motor. It is shown as the latter in FIG. 1, energized by battery 32 through conductors 50 and 52 containing switch 54. Prime mover 48 is connected to alternator 46 through clutch or one-way coupling 56. A flywheel 58 may also be connected to alternator 46.

The output of alternator 46 corresponds in voltage, frequency, and wave form to that desired to be supplied to a.c. load 26, for example, 220 volt, 60 Hz alternating current. The wave form is determined by the electromechanical configuration of alternator 46 and the frequency by its speed. Alternator 46 may include the customary voltage regulator 60 which senses the output voltage of the generator and adjusts the field strength to maintain the voltage at the desired level. Or, the alternator may be operated in the saturated condition so that it becomes self-regulating.

A signal indicative of the voltage condition of the alternator is obtained from alternator 46 in conductor 62. This may typically be a speed or frequency signal since the speed of alternator 46 decreases as power is withdrawn from the alternator, and the voltage drops, and increases as power is supplied to the alternator, and the voltage rises. The alternator voltage condition signal in conductor 62 may be compared to a reference or clock signal in frequency control 64 to generate an error signal in conductor 66.

A reference signal is provided in conductor 68 to regulating amplifier 70. The output signal from amplifier 70 in conductor 72 is provided as a reference signal to regulating amplifier 74 along with a current feedback signal from current transformer 76 in conductor 78. The output of current regulating amplifier 74 is provided in conductor 80 to inverter 36 to regulate the output current of the inverter.

The signal in conductor 62 is also provided to inverter 36 in conductor 82 to synchronize the frequency of the output of inverter 36 to that established by alternator 46.

In operation, windmill 16 is driven by the wind to rotate generator 14 and provide d.c. power at terminals 22 and 24. Switch 54 is closed to energize prime mover 48 through conductors 50 and 52. Prime mover 48 is coupled to alternator 46 through clutch 56 to accelerate the alternator to the condition in which it provides an a.c. output of the desired voltage and frequency in conductors 42 and 44. Switch 86 in the output of utilization circuit 10 may be opened so that this acceleration may occur without loading from a.c. load 26.

Inverter 36 is operated responsive to the signal in conductors 80 and 82 to provide a.c. power in conductors 42 and 44 from the d.c. power of d.c. power supply 12 having the same frequency as, and synchronized to, the a.c. output of alternator 46. The a.c. power of inverter 36 in conductors 42 and 44 appears in an energizing manner across alternator 46 permitting prime mover 48 to be disconnected and deenergized.

Switch 86 is closed to apply the a.c. output power of inverter 36 to a.c. load 26.

Alternator 46 connected across inverter 36 impresses and maintains its voltage magnitude, waveform, and frequency characteristics on the square or step wave output of inverter 36, causing the latter to assume the form of the former. For this purpose, the a.c. wave generator, such as alternator 46, should have a relatively low impedance to the higher harmonics appearing in the output of inverter 36. For example, the impedance of the a.c. wave generator to these harmonics may typically be 50 times less than the impedance of d.c. power supply 12.

Inverting means 36 is operated by the signal in conductor 80 to control the a.c. power output of the inverter to a level sufficient to both energize load 26 and drive alternator 46. If insufficient a.c. power is provided by inverter 36 to energize both, the alternator will tend to slow and its frequency will tend to drop. The signal in conductor 80 will cause inverter 36 to provide the additional power necessary to maintain the energization of a.c. load 26 and to restore alternator 46 to the proper operative state. If excess a.c. power is provided by inverter 36, alternator 46 will tend to speed up. The signal in conductor 80 will cause inverter 36 to reduce the amount of a.c. power conversion so as to maintain alternator 46 in the proper operative state.

In addition to forming an a.c. output power having the proper voltage magnitude, wave shape, and frequency characteristics from the output of inverter 36, a further advantage of alternator 46 lies in the accommodation of transient current peaks. Because of its inertia and electro-mechanical construction, alternator 46 is typically capable of handling 200 to 500% overload currents. In the case of a transient current demand, as for example, the starting of an a.c. motor, inverter 36 provides the maximum current within its safe limits of operation. The additional current is provided by alternator 46 which is driven as a generator by its own inertia, as augmented by flywheel 58. The supply of this current will slow alternator 46. However, once the transient peak has passed, the a.c. power output of inverter 36 may be used to restore the speed of alternator 46. Thus, circuitry 10 can easily accommodate transient currents of the type mentioned above, or of other types.

In the event the power available from d.c. generator 14 is insufficient to supply a.c. load 26 for a period of time greatly in excess of the inertial drive of alternator 46, alternator 46 becomes incapable of providing output power of the correct voltage and frequency to terminals 42 and 44, inverter 36 becomes inoperative, and the supply of a.c. power to load 26 ceases. When sufficient d.c. power again becomes available from d.c. generator 14, the starting sequence must be repeated in order to resume the supply of a.c. power. It will be appreciated that utilization circuit 10 may be provided with the appropriate circuitry to disconnect the circuit from a.c. loads 26 when d.c. power is lost, to sense the reoccurrence of sufficient d.c. power, and to restart alternator 46 and inverter 36 when sufficient d.c. power is again present.

As noted supra, battery 32 connected to d.c. power supply 12 may be used to provide power to inverter 36 during periods when insufficient power is available from d.c. generator 14 connected to windmill 16, thereby to maintain the energization of a.c. load 26. Battery 32 may be recharged by generator 14 during periods when excess power is available from generator 14.

Or, if prime mover 48 is a gasoline or diesel engine it may be sized so that alternator 46 can be driven by the engine as a standby power unit for a.c. load 26 when sufficient power is not available from d.c. power supply 12.

FIG. 2 shows a specific embodiment of the invention shown in FIG. 1 in which inverter 36 is of the line commutated type. In energy utilization circuit 10a shown in FIG. 2 elements similar to those found in FIG. 1 have been given similar identifying numerals. The inverter, hereinafter called switching means or bridge 36a, is connected to d.c. power supply output terminals 22 and 24. Switching means 36a may comprise a thyristor bridge having input terminals 100 and 102 and output terminals 104 and 106. Input terminals 100 and 102 are connected to d.c. power supply output terminals 22 and 24 by conductors 38 and 40 one of which contains impedance 108. As d.c. power supply 12, and particularly battery 32 may exhibit little or no impedance itself, the added impedance 108 prevents the battery from overwhelming alternator 46 causing the alternator to assume the battery voltage, rather than vice versa, as noted supra. It will be appreciated that impedance 108 may be located in the input to switching means 36a, as shown, in its output, or within the inverter.

Each of input terminals 100 and 102 is connected to each of output terminals 104 and 106 by bridge arm conductors containing thyristors to provide a pair of current conduction paths in switching means 36a between input terminals 100 and 102 and output terminals 104 and 106. One such conduction path includes thyristors 110a and 110b while the other conduction path includes thyristors 112a and 112b. Thyristors 110a and 110b and 112a and 112b are fired by firing circuit 114.

Output terminals 104 and 106 of switching means 36a are connected via conductors 42 and 44 to output terminals 28 and 30.

FIG. 2 shows the use of the tach-generator 116 in sensing the operative condition of alternator 42. The signal from tach-generator 118 is compared with a reference signal in amplifier 70 to provide an operative condition error signal in conductor 72 for supply to current limit amplifier 74. The output of current limit circuit 74 is provided in conductor 80 to firing circuit 114. Firing circuit 114 is synchronized to the frequency in conductors 42 and 44 by the signal in conductor 82 to provide firing pulses in conductors 122 to the appropriate thyristors in switching means 36a.

The operation of energy utilization circuit 10a in FIG. 2 is similar to that shown in FIG. 1 in that prime mover 44 is initially coupled to alternator 46 to accelerate the alternator to operating speed. The a.c. voltage is provided to output teminal 104 and 106 of switching means 32a. This voltage is shown in FIG. 3 by numeral 202. The d.c. voltage generated by d.c. power supply 12 and supplied to terminal 22 is shown by the numeral 204. The line commutated action of switching means 36a in providing power from d.c. power supply 12 to a.c. load 26 is more fully described in applicant's earlier U.S. Pat. Nos. 3,946,242 and 4,059,772 to which reference is made. The action may be summarized as follows. During the time intervals $T_1$-$T_2$ and $T_3$-$T_4$, the d.c. voltage applied to input terminals 100 and 102 of switching means 36a is more positive than the a.c. voltage applied to output terminals 104 and 106. Current may thus be made to flow in an input terminal of switching means 36a, for example input terminal 100, and out an output terminal, for example terminal 104, through thyristor 110a. The current is supplied to conductor 44. The current returns in conductor 42 to output terminal 106 and flows through thyristor 110b to terminal 102.

Output terminal 104 of switching means 36a and load terminal 30 are tied together by conductor 44. During the time intervals $T_1$-$T_2$ and $T_3$-$T_4$ the voltage of all these elements is positive with respect to the neutral axis. The current decribed above thus flows out the positive terminal 104 of switching means 36a and in the positive terminal 30 connected to a.c. load 26. In accordance with the analytical convention defining the supply and receipt of electrical power, when power flows out the positive terminal of an element, such as switching means 36a, that element is a source. When power flows in the positive terminal of an element, such as induction motor 26a, that element is a load. The flow of current during intervals $T_1$-$T_2$ and $T_3$-$T_4$ thus supplies power from d.c. power supply 12 to a.c. load 26.

Thyristors 110a and 110b must be rendered nonconductive during the time interval $T_2$-$T_3$ since the flow of power would reverse as the a.c. voltage reverses. Prior to time $T_1$ and subsequent to time $T_4$, the voltages applied to thyristors 110a and 110b are such as to reverse bias the thyristors.

The amount of power transferred during the time intervals $T_1$-$T_2$ and $T_3$14 $T_4$ depends on the portion of the period used for current conduction as controlled by current regulator 74. As noted in applicant's earlier patents, in practice, it is sometimes preferably, as a practical matter, to use only the time period $T_3$-$T_4$ for current conduction to use the a.c. wave form to turn off the thyristors.

FIG. 4a shows the current and power phenomena occurring during a half-cycle of a.c. voltage 202. The current required by a.c. load during the half-cycle is indicated by 206. During the time $T_3$-$T_4$, switching means 36a conducts current in a power supplying manner from d.c. power supply 12 to a.c. load 26. This current is indicated by 208. A portion of this current is provided to a.c. load 26 as its current 206. The remainder 210 is provided to alternator 46. This current causes an incremental increase in the speed 212 of alternator 46 above its nominal speed 214, as shown in FIG. 4b. Subsequent to time $T_4$, the current from d.c. power supply 12 ceases and the load current is provided by alternator 46, causing the speed of the alternator to slow. The regulation of current 208 by regulator 74 will cause the average amount of current 210 to equal the average amount of current 206 subsequent to time $T_4$ so that the speed of alternator 46 is stabilized at the average speed 214, as shown in FIG. 4b. The increments of speed change are normally so small as to be unnoticed.

The result of the foregoing operation is a subcycle absorption and release of power by alternator 46 which provides the necessary current and power to a.c. load 26.

The operation of switching means 36a and firing circuit 114 is synchronized to the output of alternator 46 by the signal in conductor 82.

FIG. 5 is similar to FIG. 3 and further shows d.c. voltage 216 which appears in the terminals of switching means 36a when thyristors 112a and 112b conduct current. The action of thyristors 110a and 110b and 112a and 112b in establishing the pair of a.c. voltages 202 and 216 shown in FIG. 5 may be considered analogous to the operation of a reversing switch in performing the same function. Thyristors 112a and 112b supply power from d.c. power supply 12 to a.c. load 26 by current conduction during the time interval $T_2$-$T_5$.

FIGS. 6a and 6b are similar to FIG. 4a but show currents existing in the circuitry of FIG. 1. FIG. 6a shows currents existing with a square wave inverter while FIG. 6b shows currents existing when a six step inverter is used. The a.c. voltage provided by generator 46 is indicated by the numeral 202. In FIG. 6a the output voltage of a square wave inverter is shown by the numeral 218. The a.c. load current is indicated by the numeral 206. The current provided by inverter 36 is indicated by the numeral 208' and would typically be continuous, as shown, due to circuit inductance. As in FIG. 4a, current 208' is divided by that necessary to form load current 206 and the excess 210' which serves to power alternator 46.

FIG. 6b shows a similar operation when inverter 36 is of the six step type. The current provided by the inverter is indicated by 208''.

FIG. 7 shows a static a.c. wave generator 150 which may be employed in the circuity of the present invention in place of alternator 46. Static a.c. wave generator 150 is connected across conductors 42 and 44 and the output of inverter 36. Similar to alternator 46, a.c. wave generator 150 must be capable of establishing and maintaining its own waveform in the face of the pulsed current of inverter 36.

A tank circuit comprised of parallel connected capacitor 152 and inductor 154 may be employed as wave generator 150. Such a tank circuit provides the desired sinusoidal waveform. The electrical characteristics capacitor 152 and inductor 154 are selected so that the tank circuit resonates at the frequency desired for the a.c. power and so that the impedance of the tank circuit to undesired harmonics in the output of inverter 36 is relatively low with respect to the impedance of d.c. source 12 and inverter 36, thereby to maintain the desired characteristics of the output power of utilization circuit 10.

The excess current 210 shown in FIG. 4a may be used to maintain the oscillation of the tank circuit. If necessary or desirable, a start up feed back and power supply circuit 156 may be employed. The current 208–210 may be utilized to synchronize the operation of the inverter to the tank circuit and the power output of inverter controlled responsive to the voltage signal in conductor 62.

Various modes of carrying out the invention are contemplated as being within the scope of the following claims particularly pointing out and distinctly claiming the subject matter which is regarded as the invention.

I claim:

1. A utilization circuit for utilizing the energy present in contemporaneous geophysical conditions to energize an a.c. load with a.c. power having selected voltage and frequency characteristics, said load being connectable to output terminals of said utilization circuit, said circuit comprising:
   conversion means responsive to the energy of the contemporaneous geophysical conditions for converting the energy to d.c. electrical power;
   inverting means having an input connected to said conversion means for receiving said d.c. electrical power, said inverting means altering said d.c. power to a.c. power and providing same to an output thereof connected to the output terminals of said circuit;
   electrical power storage means interposed at the input of said inverting means and operatively associated with said conversion means for storing power from said conversion means when said conversion means is in an excess power condition and for augmenting the power of said conversion means to the inverting means when said conversion means is in a power deficit condition;
   a.c. wave generating means connected in the output of said inverting means and to said circuit output terminals, said a.c. wave generating means assuming an operative condition, responsive to energization by said inverting means, establishing a wave having the selected voltage and frequency characteristics and maintaining said characteristics when subjected to the output of said inverting means;
   means for synchronizing the operation of said inverting means and a.c. wave generating means; and
   a.c. wave generating means operative condition signal means connected to said generating means for providing a signal responsive to the operative condition of said generating means, said signal means being coupled to said inverting means for controlling the power output of said inverting means to maintain the operative condition of said generating means.

2. The circuit according to claim 1 wherein said inverting means has current regulating means for regulating the current and wherein said wave generating means operative condition signal means is connected to said current regulating means for regulating the current in accordance with the operative condition of said wave generating means.

3. The circuit according to claim 1 wherein said a.c. wave generating means comprises electro-dynamic a.c. apparatus.

4. The circuit according to claim 3 further characterized as including a means for accelerating said electro-dynamic a.c. apparatus to a desired operative condition.

5. The circuit according to claim 3 wherein said electro-dynamic apparatus comprises an alternator.

6. The circuit according to claim 5 further including means for accelerating said alternator to a desired operative condition.

7. The circuit according to claim 1 wherein said a.c. wave generating means comprises an inductive-capacitive tank circuit.

8. The circuit according to claim 1 wherein said inverting means comprises a self-commutated inverter.

9. The circuit according to claim 1 wherein said inverting means comprises a line commutated inverter.

10. The circuit according to claim 1 wherein said a.c. wave generating means operative condition signal means is responsive to the frequency of said wave generating means.

11. The circuit according to claim 3 wherein said a.c. wave generating means operative condition signal means is responsive to the speed of said electro-dynamic a.c. apparatus.

12. The circuit according to claim 1 wherein said a.c. wave generating means operative condition signal means is responsive to the voltage of said wave generating means.

13. The circuit according to claim 1 wherein said conversion means includes means driven by the wind for providing the d.c. electrical power.

14. The circuit according to claim 1 wherein said conversion means includes means responsive to solar radiation for providing the d.c. electrical power.

15. A method of utilizing the energy present in contemporaneous geophysical conditions to energize an a.c. load with a.c. power having selected voltage and frequency characteristics, said method comprising the steps of:
   converting the energy of the contemporaneous geophysical conditions to d.c. electrical power;
   inverting the d.c. power to a.c. power for supply to the a.c. load;
   utilizing a portion of the a.c. power to establish an a.c. wave having the selected voltage and frequency characteristics;
   impressing the a.c. wave on the inverted a.c. power so that the latter assumes the form of the former; and
   maintaining the characteristics of said a.c. wave when subjected to said a.c. power.

16. The method according to claim 15 including the step of synchronizing the a.c. wave and the a.c. power.

17. The method according to claim 15 further including the step of sensing a characteristic of the a.c. wave and controlling the amount of power to maintain the characteristics of the a.c. wave.

18. The method according to claim 17 wherein the sensing step is further defined as sensing the frequency of the a.c. wave.

19. The method according to claim 17 wherein the a.c. wave is established by a rotating machine and wherein the sensing step is further defined as sensing the speed of the rotating machine.

20. The method according to claim 15 including the step of sensing the magnitude of the power supplying current and regulating the current in accordance therewith.

21. The method according to claim 15 including the step of storing the d.c. power during periods of excess energy and utilizing the stored power for inversion during periods of energy deficit.

22. The method according to claim 15 further defined as utilizing wind energy and wherein the conversion step is further defined as converting the energy of the wind into d.c. electrical power.

23. The method according to claim 15, further defined as utilizing solar energy and wherein the step of converting the energy is further defined as converting the solar energy to d.c. electrical power.

24. The method according to claim 17 wherein the sensing step is further defined as sensing the voltage of the a.c. wave.

* * * * *